United States Patent
Zuniga et al.

(10) Patent No.: US 8,917,660 B2
(45) Date of Patent: Dec. 23, 2014

(54) METHOD FOR PERFORMING WIRELESS SWITCHING

(75) Inventors: Juan Carlos Zuniga, Ville St. Laurent (CA); Teresa Joanne Hunkeler, Montreal, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/113,713

(22) Filed: May 23, 2011

(65) Prior Publication Data

US 2011/0222617 A1 Sep. 15, 2011

Related U.S. Application Data

(63) Continuation of application No. 10/334,858, filed on Dec. 31, 2002, now abandoned.

(60) Provisional application No. 60/394,151, filed on Jul. 5, 2002.

(51) Int. Cl.
*H04W 4/00* (2009.01)
*H04W 72/04* (2009.01)
*H04W 4/06* (2009.01)
*H04W 84/12* (2009.01)
*H04W 88/08* (2009.01)
*H04W 72/08* (2009.01)
*H04W 16/14* (2009.01)

(52) U.S. Cl.
CPC ............ *H04W 72/04* (2013.01); *H04W 72/046* (2013.01); *H04W 4/06* (2013.01); *H04W 84/12* (2013.01); *H04W 88/08* (2013.01); *H04W 72/08* (2013.01); *H04W 16/14* (2013.01); *H04W 72/0453* (2013.01)
USPC ...................................... 370/328; 455/452.1

(58) Field of Classification Search
CPC ........................ H04W 72/04; H04W 72/0453
See application file for complete search history.

(56) References Cited

U.S. PATENT DOCUMENTS 5,463,400 A 10/1995 Tayloe
5,726,978 A * 3/1998 Frodigh et al. ................ 370/252
(Continued)

FOREIGN PATENT DOCUMENTS

EP 1263168 12/2002
JP 2001298436 A2 10/2001
(Continued)

OTHER PUBLICATIONS

Ko et al. "Medium Access Control Protocols Using Directional Antennas in Ad Hoc Networks." InfoCom 2000. Nineteenth Annual Joint Conference of the IEEE Computer and Communications Societies. Proceedings, IEEE Tel Aviv, Israel, Mar. 26-30, 2000, vol. 1, pp. 13-21.

(Continued)

*Primary Examiner* — Gregory Sefcheck
(74) *Attorney, Agent, or Firm* — Volpe and Koenig, P.C.

(57) ABSTRACT

A wireless communication system includes an infrastructure device for transmitting and receiving communications to and from a plurality of user terminals. Each user terminal includes a receiver and a controller that receives a first orthogonal frequency division multiplexing (OFDM) signal on a first carrier frequency that has assignment information indicating a second carrier frequency to transmit uplink data and beam forming information. In response to the assignment information, a transmitter of the user terminal transmits a second OFDM signal on the second carrier frequency using a beam indicated in the beam forming information.

6 Claims, 2 Drawing Sheets

(56) References Cited

U.S. PATENT DOCUMENTS

| | | | |
|---|---|---|---|
| 5,781,536 | A | 7/1998 | Ahmadi et al. |
| 5,933,420 | A | 8/1999 | Jaszewski et al. |
| 6,052,594 | A * | 4/2000 | Chuang et al. ............... 455/450 |
| 6,144,340 | A | 11/2000 | Kliski et al. |
| 6,215,982 | B1 | 4/2001 | Trompower |
| 6,259,898 | B1 | 7/2001 | Lewis |
| 6,345,043 | B1 | 2/2002 | Hsu |
| 6,393,261 | B1 | 5/2002 | Lewis |
| 6,647,015 | B2 * | 11/2003 | Malkemes et al. ............ 370/401 |
| 6,721,569 | B1 * | 4/2004 | Hashem et al. ............... 455/450 |
| 6,813,254 | B1 * | 11/2004 | Mujtaba ....................... 370/335 |
| 6,859,450 | B1 | 2/2005 | Mansfield |
| 6,904,283 | B2 * | 6/2005 | Li et al. ......................... 455/450 |
| 6,940,827 | B2 * | 9/2005 | Li et al. ......................... 370/278 |
| 6,967,937 | B1 | 11/2005 | Gormley |
| 7,020,110 | B2 * | 3/2006 | Walton et al. ................. 370/334 |
| 7,072,315 | B1 * | 7/2006 | Liu et al. ....................... 370/329 |
| 7,075,967 | B2 * | 7/2006 | Struhsaker et al. ........... 375/130 |
| 7,133,380 | B1 * | 11/2006 | Winters et al. ............... 370/329 |
| 7,206,586 | B2 * | 4/2007 | Kim et al. ..................... 455/450 |
| 7,230,931 | B2 * | 6/2007 | Struhsaker ..................... 370/280 |
| 7,289,467 | B2 * | 10/2007 | Bourlas et al. ................ 370/328 |
| 7,304,939 | B2 * | 12/2007 | Steer et al. .................... 370/208 |
| 7,346,357 | B1 * | 3/2008 | Kim et al. ..................... 455/453 |
| 7,414,964 | B2 * | 8/2008 | Hashem et al. ............... 370/208 |
| 7,573,891 | B1 * | 8/2009 | Chow et al. ................... 370/401 |
| 7,636,573 | B2 * | 12/2009 | Walton et al. ................. 455/454 |
| 7,852,812 | B2 * | 12/2010 | Li et al. ......................... 370/335 |
| 8,036,164 | B1 * | 10/2011 | Winters et al. ............... 370/329 |
| 8,040,855 | B2 * | 10/2011 | Li et al. ......................... 370/335 |
| 8,094,625 | B2 * | 1/2012 | Walton et al. ................. 370/334 |
| 2001/0022805 | A1 | 9/2001 | Dabak et al. |
| 2001/0030988 | A1 | 10/2001 | Fry |
| 2002/0021684 | A1 | 2/2002 | Toshimitsu et al. |
| 2003/0067901 | A1 | 4/2003 | Schein et al. |
| 2003/0156570 | A1 | 8/2003 | Alamouti et al. |
| 2007/0030886 | A1 | 2/2007 | Doi |

FOREIGN PATENT DOCUMENTS

| | | |
|---|---|---|
| JP | 2002-084221 | 3/2002 |
| JP | 2003-052079 | 2/2003 |
| KR | 2001-0090038 | 10/2001 |
| WO | 98/12833 | 3/1998 |
| WO | 99/21310 | 4/1999 |
| WO | 99/56416 | 11/1999 |
| WO | 0064006 A1 | 10/2000 |
| WO | 02/11348 | 2/2002 |
| WO | 02/28121 | 4/2002 |
| WO | 02/37754 | 5/2002 |

OTHER PUBLICATIONS

Muta et al., "Adaptive Channel Selection in Frequency-selective Fading Environment," IEICE Transactions on Communications, vol. J82-B, No. 5, pp. 991-1000, (May 1999). (In Japanese).

Berezdivin et al. "Next Generation Wireless Communications Concepts and Technologies," IEEE, pp. 108-116, (Mar. 2002).

Ko et al. "Medium Access Control Protocols Using Directional Antennas in Ad Hoc Networks." InfoCom 2000. Nineteenth Annual Joint Conference of the IEEE Computer and Communications Societies. Proceedings, IEEE Tel Aviv, Israel, Mar. 26-30, 2000, vol. 1, Mar. 26, 2000. pp. 13-21.

Muta et al., "Adaptive Channel Selection in Frequency-selective Fading Environment," IEEE International Conference on Communications, vol. 3, pp. 1846-1851 (1999).

Muta et al., "Adaptive Channel Selection in Frequency-selective Fading Environment," IEICE Transactions on Communications, vol. J82-B, No. 5, pp. 991-1000, (May 1999). (In Japanese).

Myles et al. "IEEE 802.11h Potential Draft Text D2.0" IEEE P802.11 Wireless LANs, Mar. 2002, pp. i-67.

* cited by examiner

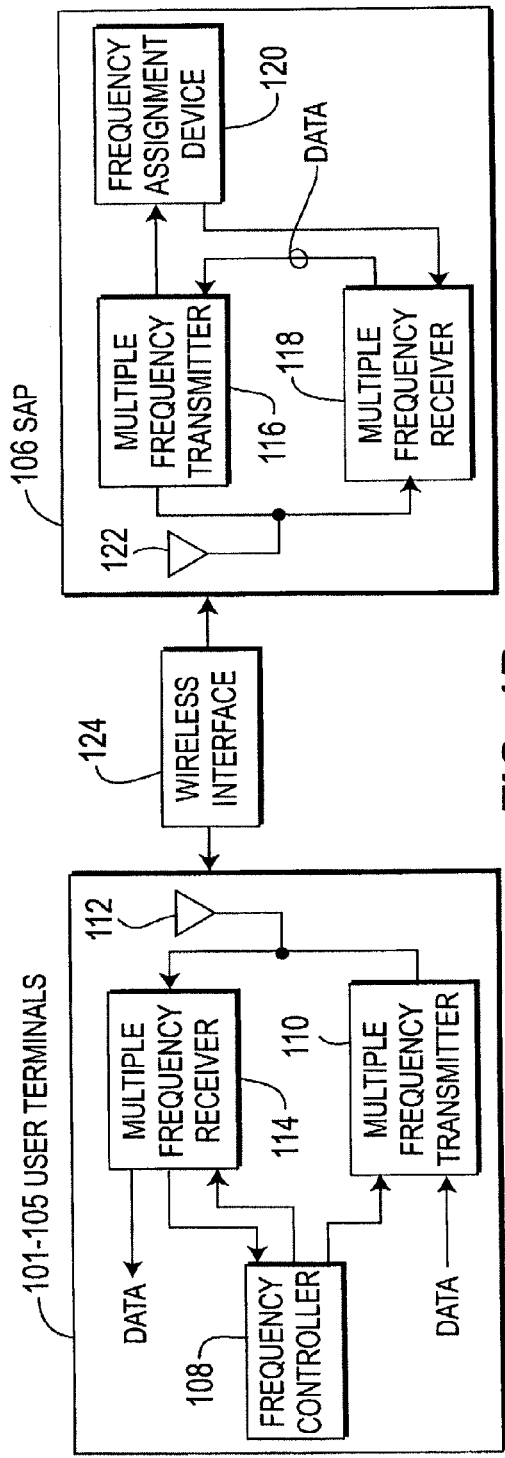
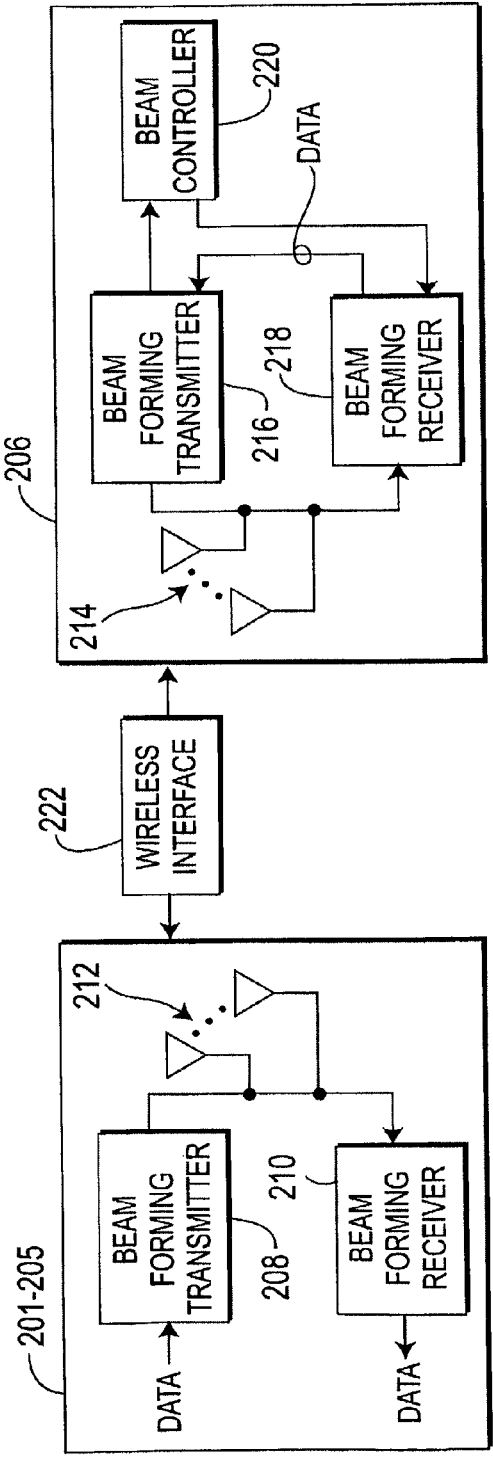
FIG. 1B
FIG. 2B

METHOD FOR PERFORMING WIRELESS SWITCHING

CROSS REFERENCE TO RELATED APPLICATION

This application is a continuation of U.S. patent application Ser. No. 10/334,858 filed Dec. 31, 2002, which claims the benefit of U.S. Provisional Application No. 60/394,151, filed on Jul. 5, 2002, which is incorporated by reference as if fully set forth.

FIELD OF INVENTION

The present invention relates to a Wireless LAN system (WLAN) with several users connected. More particularly, switching of WLAN systems for avoiding collisions.

BACKGROUND

WLAN systems make use of the unlicensed bands for wireless communication. Transmissions of a wireless LAN (WLAN) communication system may be from a particular terminal to a desired destination, either another terminal within the same Basic Service System (BSS) or the backbone network, but always within the same carrier. There are two modes of operation for WLAN systems: ad-hoc and infrastructure. In the ad-hoc mode, terminals can talk to each other in a multipoint-to-multipoint fashion. In the infrastructure mode, an access point (AP) acts as a base station to control the transmissions among users, thus providing a point-to-multipoint wireless network. Since all the users share the same medium in a WLAN, the infrastructure mode becomes more efficient for semi-heavy to heavy loaded networks.

In an infrastructure mode, the terminal first communicates with the AP when sending data to a desired destination terminal. The AP in turn bridges or routes the information to the desired destination. Thus, in this mode, an AP of a WLAN communication system controls the transmissions within a BSS or cell.

Medium Access Control (MAC) protocols are defined to coordinate the channel usage for WLAN users sharing the band. These MAC protocols are based upon avoiding collisions between users as several users access the channel at the same time. The efficiency of a protocol is gauged by successful avoidance of collisions.

Two protocols used by WLAN are CSMA/CA MAC and CSMA/CD Ethernet protocol. Both protocols can sense the carrier for other transmissions. An Ethernet can be connected in various manners, including Ethernet hubs and Ethernet switches. An Ethernet hub concentrates the connections in a central point as a point-to-multipoint connection, with no impact on performance. An Ethernet switch operates every time that there is a packet arrival from a terminal. The switch reads the destination address, learns on which port it is connected and makes a direct connection between the two physical ports. The advantage of the Ethernet switch is that the MAC does not sense any other user in the medium, which improves performance through reduced probability of collisions and enhanced throughput as compared to an Ethernet hub. An Ethernet hub forwards a received packet to all users, even when there is only one intended receiver. The hub does not look at address information. The Ethernet switch only sends the packet directly to the intended destination, resulting in a more efficient usage of the available bandwidth.

A common WLAN AP is not capable of using more than one carrier frequency at the same time, which results in low protocol efficiency. Ethernet switches have proven to improve the efficiency of the Ethernet protocol considerably.

Therefore, what is needed is a method for improving the performance of a wireless point-to-multipoint network when the terminals share the same medium.

SUMMARY

A wireless LAN (WLAN) system for communications among a plurality of users within a basic service system or cell comprising a switching access point (SAP) for transmitting and receiving point-to-multipoint communications to and from the users. A plurality of ports are available at the SAP, each of which assigned to a unique carrier frequency for isolating communications among the users to prevent collisions, with the ability of frequency assignment to be non-permanent, and a capability of dynamic or pseudo-random carrier assignment. An alternative embodiment of the SAP uses beam forming to provide spatial ports for assignments to the plurality of users.

BRIEF DESCRIPTION OF THE DRAWING(S)

FIG. 1B shows a simplified diagram of a user terminal and a switching access point using frequency carrier Ethernet ports.

FIG. 2B shows a simplified diagram of a user terminal and a switching access point using spatial beam Ethernet ports.

DESCRIPTION OF THE PREFERRED EMBODIMENTS

Figure 1A:
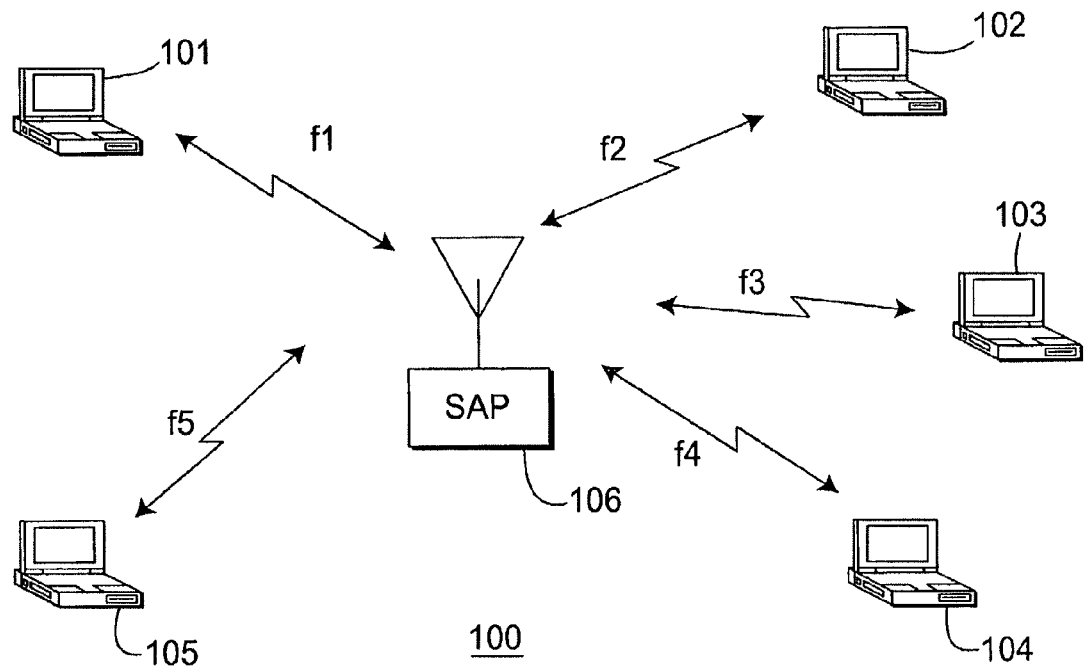
FIG. 1A shows a system diagram of a WLAN with frequency carrier Ethernet ports.

FIG. 1A shows a system that applies the Ethernet switch principle to an access point (AP), allowing multi-frequency operation, so that the AP becomes a Switching Access Point (SAP) 106. Frequency carriers f1-f5 are treated as different ports in the SAP, from which user terminals 101-105 have centralized access to frequency carriers f1-f5 in a controlled manner.

As shown in FIG. 1A, each user terminal 101-105 is assigned to a frequency carrier f1-f5 and SAP 106 is capable of receiving and transmitting each carrier f1-f5. In order to avoid permanent assignment of carriers f1-f5 to each user terminal 101-105, two approaches may be used. In the preferred embodiment, it is desirable, although not essential, to not permanently assign carriers to user terminals 101-105. A non-permanent assignment avoids assigning a frequency to a terminal not sending data. When there are more terminals than available frequencies, a terminal that has data to send can be prevented from doing so if the terminal permanently assigned to a frequency is not using it.

A dynamic carrier assignation (DCA) scheme can be applied, in which user terminals 101-105 send a request-to-send (RTS) in a shared carrier and then the SAP replies with a clear-to-send (CTS) indicating the carrier that can be used for the transmission.

Alternatively, a frequency hopping scheme may be used, in which user terminals 101-105 have a pseudo-random sequence for changing carriers, known a priori by user terminals 101-105 and SAP 106, to minimize the probability of two user terminals simultaneously using the same carrier. For a preferred WLAN developed according to the current 802.11b standard, three carriers are used for frequency hopping. For the 802.11a standard, eight carriers are used for frequency hopping. Wireless switching system 100 may employ DCA and frequency hopping either separately or combined.

FIG. 1B is an illustration of a preferred user terminal and SAP using multiple frequencies. The SAP 106 has a frequency assignment device 120 for assigning frequencies (frequency ports) to the user terminals 101-105. A multiple frequency receiver 118 receives data sent by the terminals 101-105 using the assigned frequency port. A multiple frequency transmitter 116 sends data from one terminal to another using the assigned frequency of the destination terminal. The multiple frequency transmitter 116 preferably also transmits the frequency assignment to the terminals 101-105. An antenna 122 or antenna array is used to send and receive data by the SAP 106 over the wireless interface 124.

The terminals 101-105 have a multiple frequency receiver 114 for receiving the frequency assignment and recovers the transmitted data over the terminal's assigned frequency. A frequency controller 108 users the received assigned frequencies to control the transmission and reception frequencies of the terminal 101-105. A multiple frequency transmitter 110 transmits the data over the assigned frequency.

Figure 2A:
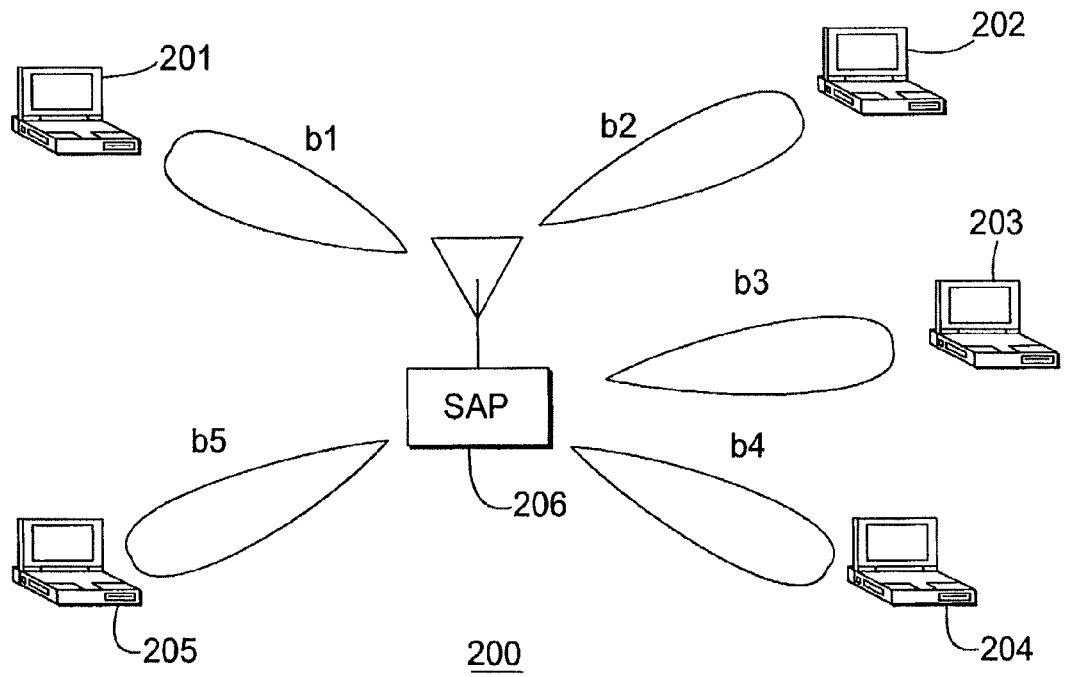
FIG. 2A shows a system diagram of a WLAN with spatial beam Ethernet ports.

FIG. 2A shows an alternative embodiment of wireless switching by assigning each user terminal 201-205 to a spatial port instead of a particular frequency. As shown in FIG. 2A, spatial beams b1-b5 are created by beam forming and can be used as ports to isolate user terminals 201-206 from each other. SAP 206 recognizes the destination address of each user terminal 201-205, and associates a beam to each address. SAP 206 is capable of receiving more than one beam at the same time.

FIG. 2B is an illustration of a preferred user terminal and SAP using spatial beams. The SAP 206 has a beam controller 220 for determining which beam (spatial port) is associated with a particular user. The controller 220 provides a beam forming transmitter 216 and a beam forming receiver 218 the beam information so that the appropriate spatial port is used for a given terminal. An antenna array 214 is used to send and receive data over the wireless interface 222.

The terminals 201-205 have a beam forming receiver 210 for receiving transmitted data using an antenna array 212. A beam forming transmitter 208 is used to transmit data to the SAP 206 using the array 212.

Although the system configurations of FIGS. 1A, 1B, 2A and 2B show five user terminals, any number of user terminals may be used. The intent is to demonstrate and not to limit or restrict the scope of the system capabilities. The wireless switching systems of FIGS. 1A and 2A can be used separately or combined. To illustrate, user terminals 101-105 can be distinguished by a combination of spatial beam and frequency. The wireless switching systems of FIGS. 1A and 2A can be applied to systems including, but not limited to, direct sequence (DS) WLAN and orthogonal frequency division multiplexing (OFDM) WLAN systems.

What is claimed is:

1. A wireless user terminal comprising:
a receiver and a controller configured to receive a first orthogonal frequency division multiplexing (OFDM) signal on a first carrier frequency of a downlink; wherein the first OFDM signal includes first carrier frequency assignment information indicating a second carrier frequency to transmit uplink data and first beam forming information indicating a first spatial beam;
a transmitter and the controller configured in response to the first carrier frequency assignment information, to transmit a second OFDM signal on the second carrier frequency and using a first spatial beam over an antenna array as indicated by the first beam forming information;
the receiver and the controller are further configured to receive a third OFDM signal on the first carrier frequency of the downlink; wherein the third OFDM signal includes second carrier frequency assignment information indicating a third carrier frequency to transmit uplink data and second beam forming information indicating a second spatial beam;
the transmitter and the controller are further configured in response to the second carrier frequency assignment information, to transmit a fourth OFDM signal on the third carrier frequency and using a second spatial beam over the antenna array as indicated by the second beam forming information;
the receiver and the controller are further configured to receive a fifth OFDM signal on the first carrier frequency of the downlink; wherein the fifth OFDM signal includes third carrier frequency assignment information indicating a fourth carrier frequency to receive downlink data and third beam forming information indicating a third spatial beam; and
the receiver and the controller are further configured to receive a sixth OFDM signal on the fourth carrier frequency and third spatial beam in response to the third carrier frequency assignment information and the third beam forming information: wherein the first carrier frequency, the second carrier frequency, the third carrier frequency and the fourth carrier frequency are different from each other.

2. The wireless user terminal of claim 1, wherein the transmitter and the controller are further configured to transmit an indication that the wireless user terminal has data to transmit and the first OFDM signal including the first carrier frequency assignment information is received in response to the indication that the wireless user terminal has data to transmit.

3. A method comprising:
receiving, by a wireless user terminal, a first orthogonal frequency division multiplexing (OFDM) signal on a first carrier frequency of a downlink; wherein the third OFDM signal includes first carrier frequency assignment information indicating a second carrier frequency to transmit uplink data and first beam forming information indicating a first spatial beam;
in response to the first carrier frequency assignment information, transmitting, by the wireless user terminal, a second OFDM signal on the second carrier frequency and using a first spatial beam indicated by the first beam forming information;
receiving, by the wireless user terminal, a third OFDM signal on the first carrier frequency of the downlink; wherein the third OFDM signal includes second carrier frequency assignment information indicating a third carrier frequency to transmit uplink data and second beam forming information indicating a second spatial beam;
in response to second carrier frequency assignment information, transmitting, by the wireless user terminal, a fourth OFDM signal on the third carrier frequency and using a second spatial beam over the antenna array as indicated by the second beam forming information;
receiving, by the wireless user terminal, a fifth OFDM signal on the first carrier frequency of the downlink; wherein the fifth OFDM signal includes third carrier frequency assignment information indicating a fourth carrier frequency to receive downlink data and third beam forming information indicating a third spatial beam; and in response to the third carrier frequency assignment information and the third beam forming information, receiving, by the wireless user terminal, a sixth OFDM signal on the fourth carrier frequency and third spatial beam; wherein the first carrier frequency, the second carrier frequency, the third carrier frequency and the fourth carrier frequency are different from each other.

4. The method of claim 3, further comprising transmitting, by the wireless user device, an indication that the wireless user terminal has data to transmit; wherein the first OFDM signal including the first carrier frequency assignment information is received in response to the indication that the wireless user terminal has data to transmit.

5. An infrastructure device comprising:
  at least one component configured to transmit a first orthogonal frequency division multiplexing (OFDM) signal on a first carrier frequency of a downlink; wherein the first OFDM signal includes first carrier frequency assignment information for a wireless user device indicating a second carrier frequency to transmit uplink data and first beam forming information indicating a first spatial beam;
  the at least one component further configured in response to the first carrier frequency assignment information, to receive a second OFDM signal on the second carrier frequency and on the first spatial beam over an antenna array as indicated by the first beam forming information;
  the at least one component further configured to transmit a third OFDM signal on the first carrier frequency of the downlink; wherein the third OFDM signal includes second carrier frequency assignment information for the wireless user device indicating a third carrier frequency to transmit uplink data and second beam forming information indicating a second spatial beam;
  the at least one component further configured in response to the second carrier frequency assignment information, to receive a fourth OFDM signal on the third carrier frequency and on a second spatial beam over the antenna array as indicated by the second beam forming information;
  the at least one component further configured to transmit a fifth OFDM signal on the first carrier frequency of the downlink; wherein the fifth OFDM signal includes third carrier frequency assignment information for the wireless user device indicating a fourth carrier frequency to receive downlink data and third beam forming information indicating a third spatial beam; and
  the at least one component further configured to transmit a sixth OFDM signal on the fourth carrier frequency and third spatial beam in response to the third carrier frequency assignment information and the third beam forming information; wherein the first carrier frequency, the second carrier frequency, the third carrier frequency and the fourth carrier frequency are different from each other.

6. The infrastructure device of claim 5, wherein the at least one component is further configured to receive an indication that the wireless user terminal has data to transmit and the first OFDM signal including the first carrier frequency assignment information is transmitted in response to the indication that the wireless user terminal has data to transmit.

* * * * *